United States Patent
Krause et al.

(10) Patent No.: US 8,437,958 B2
(45) Date of Patent: May 7, 2013

(54) METHOD AND SYSTEM FOR PROVIDING WIRELESS CONNECTION CONDITIONS ALONG A NAVIGATION ROUTE

(75) Inventors: Kevin R. Krause, Northville, MI (US); William E. Italia, Howell, MI (US)

(73) Assignee: General Motors LLC, Detroit, MI (US)

( * ) Notice: Subject to any disclaimer, the term of this patent is extended or adjusted under 35 U.S.C. 154(b) by 2300 days.

(21) Appl. No.: 11/273,659

(22) Filed: Nov. 14, 2005

(65) Prior Publication Data

US 2007/0112504 A1 May 17, 2007

(51) Int. Cl.
*G01C 21/34* (2006.01)

(52) U.S. Cl.
USPC ........... 701/533; 701/410; 701/417; 701/420; 701/517; 701/532; 340/995.19; 340/995.23

(58) Field of Classification Search ........... 701/200, 701/210; 455/456
See application file for complete search history.

(56) References Cited

U.S. PATENT DOCUMENTS

| | | | | |
|---|---|---|---|---|
| 5,701,585 A * | 12/1997 | Kallin et al. | ........... | 455/437 |
| 5,732,383 A * | 3/1998 | Foladare et al. | ........... | 455/456.5 |
| 6,400,690 B1 * | 6/2002 | Liu et al. | ........... | 370/252 |
| 6,560,517 B2 * | 5/2003 | Matsui | ........... | 701/32.7 |
| 6,615,133 B2 * | 9/2003 | Boies et al. | ........... | 701/533 |
| 6,643,587 B2 * | 11/2003 | Brodie et al. | ........... | 701/472 |
| 6,691,028 B2 * | 2/2004 | Bullock et al. | ........... | 701/420 |
| 6,728,612 B1 * | 4/2004 | Carver et al. | ........... | 701/34.3 |
| 6,842,620 B2 * | 1/2005 | Smith et al. | ........... | 455/456.1 |
| 6,853,907 B2 * | 2/2005 | Peterson et al. | ........... | 701/517 |
| 6,871,139 B2 * | 3/2005 | Liu et al. | ........... | 701/410 |
| 6,917,876 B2 * | 7/2005 | Martell et al. | ........... | 701/533 |
| 6,950,745 B2 * | 9/2005 | Agnew et al. | ........... | 701/414 |
| 7,266,450 B2 * | 9/2007 | Glaza | ........... | 701/417 |
| 8,315,785 B2 * | 11/2012 | Okuyama | ........... | 701/117 |
| 2002/0040271 A1 * | 4/2002 | Park et al. | ........... | 701/209 |
| 2003/0187573 A1 * | 10/2003 | Agnew et al. | ........... | 701/201 |
| 2004/0203436 A1 | 10/2004 | Oesterling | | |
| 2004/0260458 A1 * | 12/2004 | Park et al. | ........... | 701/200 |
| 2005/0055155 A1 * | 3/2005 | Mafune | ........... | 701/202 |

(Continued)

FOREIGN PATENT DOCUMENTS

| | | |
|---|---|---|
| CN | 1409280 A | 4/2003 |
| CN | 1498335 | 5/2004 |

OTHER PUBLICATIONS

Internet Search via Dictionary.com for Computer Telephone Integration, see attached pdf.*
U.S. Appl. No. 10/293,771, filed Nov. 13, 2002, Curtis L. Hay.

(Continued)

*Primary Examiner* — Khoi Tran
*Assistant Examiner* — Jonathan L Sample
(74) *Attorney, Agent, or Firm* — Dierker & Associates, P.C.

(57) ABSTRACT

A method for providing wireless connection conditions to a mobile vehicle, including receiving navigation route information at a call center; determining wireless connection conditions associated with the received route; and transmitting a message including wireless connection conditions associated with the navigation route to the mobile vehicle. Another example provides a computer usable medium and program code, including program code for receiving navigation route information at a call center; program code for determining wireless connection conditions associated with the received route; and program code for transmitting a message including wireless connection conditions. Another example provides a system including means for receiving navigation route information at a call center, means for determining wireless connection conditions associated with the received navigation route, and means for transmitting a message including wireless connection conditions.

23 Claims, 12 Drawing Sheets

U.S. PATENT DOCUMENTS

| | | | |
|---|---|---|---|
| 2005/0222933 A1* | 10/2005 | Wesby | 705/36 |
| 2005/0261830 A1* | 11/2005 | Furukawa | 701/211 |
| 2006/0136122 A1* | 6/2006 | Fraser et al. | 701/202 |
| 2006/0265125 A1* | 11/2006 | Glaza | 701/210 |
| 2006/0271283 A1* | 11/2006 | Fraser et al. | 701/209 |
| 2007/0043503 A1* | 2/2007 | Oesterling et al. | 701/211 |
| 2007/0106468 A1* | 5/2007 | Eichenbaum et al. | 701/211 |
| 2007/0112504 A1* | 5/2007 | Krause et al. | 701/200 |

OTHER PUBLICATIONS

U.S. Appl. No. 10/293,772, filed Nov. 13, 2002, Chris. L. Oesterling.

* cited by examiner

METHOD AND SYSTEM FOR PROVIDING WIRELESS CONNECTION CONDITIONS ALONG A NAVIGATION ROUTE

FIELD OF THE INVENTION

This invention relates generally to data transmissions over a wireless communication system. More specifically, the invention relates to a strategy for notifying mobile vehicles of wireless communication issues along a planned navigation route.

BACKGROUND OF THE INVENTION

Many mobile vehicles incorporate an integrated communication system, such as a telematics unit, providing navigational assistance and other fee-based subscription services. The telematics unit includes a cellular radio, satellite transceiver, and/or global positioning capabilities. One method for providing subscription services utilizes a radio communication link to transfer data between the telematics unit and a call center through a wireless network. Often this communication link includes the emerging One Times Radio Transmission Technology (CDMA 1×RTT) packet data protocol. In addition, normal operational outages affect the ability for the telematics unit to communicate with the call center. The lack of an active data connection to a vehicle decreases a driver's experience with navigation systems because alerts and problems cannot be addressed while they are in an area without an active data connection.

The present invention overcomes these disadvantages and advances the state of the art.

SUMMARY OF THE INVENTION

One aspect of the present invention provides a method of providing wireless connection conditions along a planned navigation route to a mobile vehicle. The method includes receiving navigation route information at a call center, determining the wireless connection conditions associated with the received navigation route, and transmitting a message including wireless connection conditions associated with the navigation route to the mobile vehicle.

Another aspect of the present invention provides a computer usable medium including computer readable code for providing wireless connection conditions to a mobile vehicle. The medium includes computer readable code for receiving navigation route information, computer readable code for determining wireless connection conditions associated with the received navigation route, and computer readable code for transmitting a message including wireless connection conditions associated with the navigation route to the mobile vehicle.

Another aspect of the present invention provides a system for providing wireless connection conditions to a mobile vehicle. The system includes means for receiving navigation route information, means for determining wireless connection conditions associated with the received navigation route, and means for transmitting a message including wireless connection conditions associated with the navigation route to the mobile vehicle.

The aforementioned, and other features and advantages of the invention will become further apparent from the following detailed description of the presently preferred examples, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE PRESENTLY PREFERRED EXEMPLARY EMBODIMENTS

Figure 1:
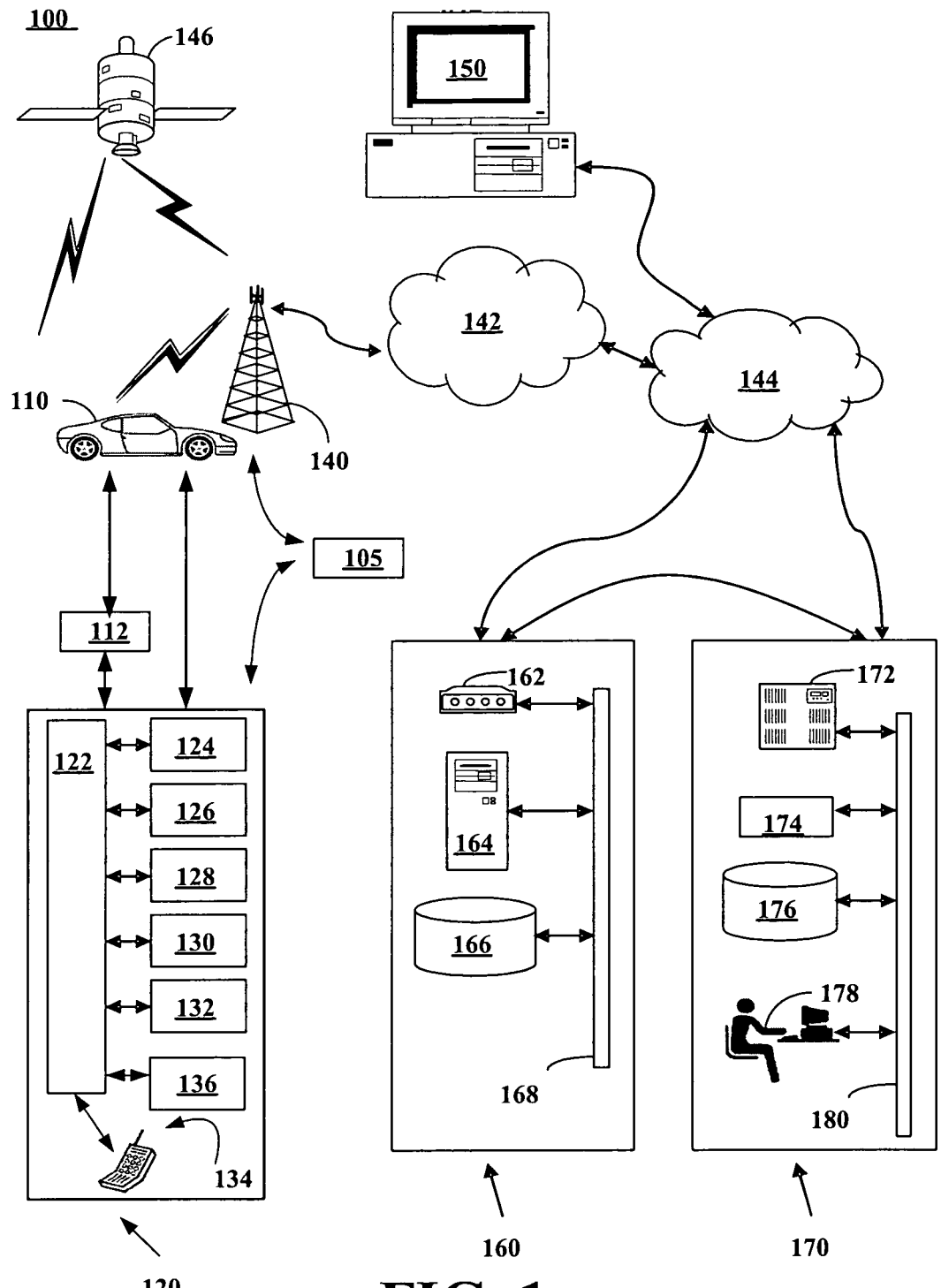
FIG. 1 illustrates a system for a call center communicating with a telematics unit in a mobile vehicle.

FIG. 1 illustrates a system for a call center communicating with a telematics unit in a mobile vehicle, in accordance with one example of the present invention and shown generally by numeral 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one example, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 is implemented as a motor vehicle, a marine vehicle, or as an aircraft, in various examples. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one example, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other examples, telematics unit 120 is implemented without one or more of the above listed components such as, for example, speakers 132. Telematics unit 120 may include additional components not relevant to the present discussion.

In one example, processor 122 is implemented as a microcontroller, controller, host processor, or vehicle communications processor. In an example, processor 122 is implemented as an application specific integrated circuit (ASIC). In another example, processor 122 is implemented as a processor working in conjunction with a central processing unit (CPU) performing the function of a general purpose processor. GPS unit 126 provides latitudinal and longitudinal coordinates of the vehicle responsive to a GPS broadcast signal received from one or more GPS satellite broadcast systems (not shown). In-vehicle mobile phone 134 is a cellular-type phone such as, for example a digital, dual-mode (e.g., analog and digital), dual-band, multi-mode or multi-band cellular phone. In one example, processor 122 determines route corrections based on transmitted digital map information from the call center 170.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one example, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one example, these digital signals activate the programming mode and operation modes, as well as provide for data transfers such as, for example, data over voice channel communication. In this example, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one example, wireless carrier system 140 is implemented as any type of broadcast communication in addition to satellite broadcast system 146. In another example, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one example, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one example, broadcast services include various formatted programs based on a package subscription obtained by the user and managed by telematics unit 120. In another example, broadcast services include various formatted data packets based on a package subscription obtained by the user and managed by call center 170. Data packets include route data and digital map information. In an example, digital map information data packets received by the telematics unit 120 from the call center 170 are implemented by processor 122 to determine a route correction.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In another or the same example, rules for determining probable off-route conditions are configurable through the web-hosting portal 160.

In operation, a client utilizes computer 150 to initiate setting or re-setting of user preferences for MVCU 110 and/or probable off-route condition determinations. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160. In another example, a client utilizes computer 150 to configure rules used by call center 170 for determining probable off-route condition(s).

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 transmits digital data to and from modem 162, data that is then transferred to web server 164. In one example, modem 162 resides inside web server 164. Land network 144 transmits data communications between web-hosting portal 160 and call center 170.

Web server 164 receives user-preference data from computer 150 via land network 144. In alternative examples, computer 150 includes a wireless modem to send data to web-hosting portal 160 through a wireless communication network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle. In another example, web server 164 further includes data for managing turn-by-turn navigational instructions.

In one example, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one example, the call center is a telematics call center, facilitating communications to and from telematics unit 120 in MVCU 110. In another example, the call center is a voice call center, providing verbal communications between an advisor in the call center and a subscriber in a mobile vehicle. In yet another example, the call center contains each of these functions. In other examples, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one example, communication services manager 174 includes at least one digital and/or analog modem.

Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one example, communication services advisor 178 is implemented as a real advisor. In an example, a real advisor is a human being in verbal communication with a user or subscriber (e.g., a client) in MVCU 110 via telematics unit 120. In another example, communication services advisor 178 is implemented as a virtual advisor. In an example, a virtual advisor is implemented as a synthesized voice interface responding to service requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one example, the call is routed to telematics unit 120 from call center 170 via land network 144, communication network 142, and wireless carrier system 140. In another example, an outbound communication is routed to telematics unit 120 from call center 170 via land network 144, communication network 142, wireless carrier system 140, and satellite broadcast system 146. In this example, an inbound communication is routed to call center 170 from telematics unit 120 via wireless carrier system 140, communication network 142, and land network 144.

Figure 2:
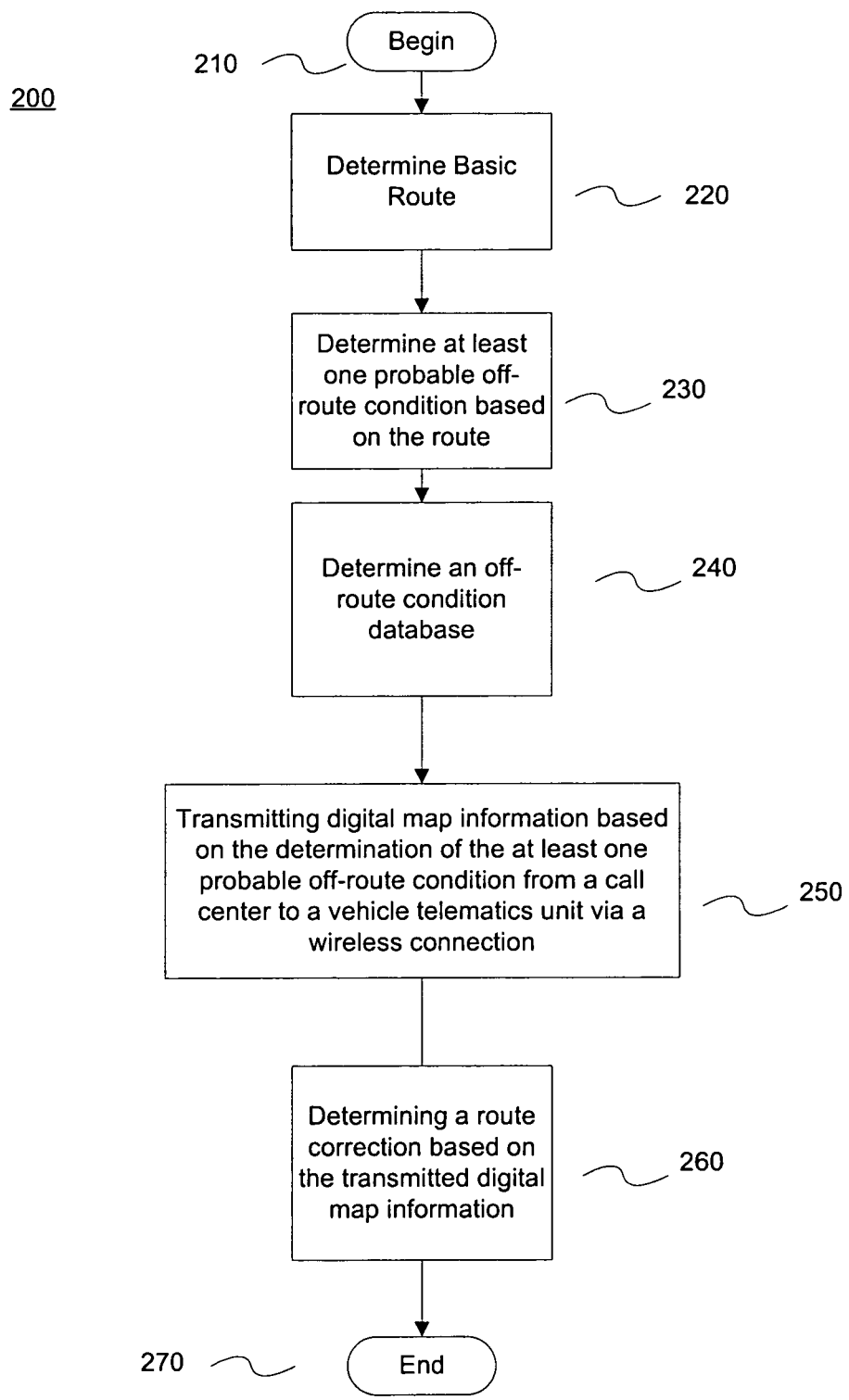
FIG. 2 illustrates a flowchart of navigating a vehicle, in accordance with one example of the present invention.

FIG. 2 illustrates a flowchart of one example of a representative method 200 of navigating a vehicle. Method 200 begins at 210. A program and/or portions thereof is, in various examples, stored and executed by the MVCU 110, web-hosting portal 160, call center 170, and associated (sub-) components as needed to navigate the vehicle. An off-route condition includes a variety of route maneuvers and is not limited to the intersection of two or more roads. The off-route database 240 includes portions along a determined route where it is possible to navigate the vehicle off the route, such as at intersecting roads, paths, turn-offs, and the like.

At step 220, a route is determined. In one example, the route is determined at the call center 170 based on a navigation assistance request made by the user. The user initiates a voice or data navigation assistance request to the communication services manager 174 in order to determine the route. The request includes a route startpoint and a route endpoint. Alternatively, the GPS unit 126 provides the startpoint. Once the request is made, the route is determined based on the startpoint and endpoint. The determined route includes turn-by-turn directions for navigating the vehicle from the startpoint origin to the endpoint destination.

Strategies for determining routes from provided startpoints and endpoints are known to those skilled in the art. The determined route will vary depending on factors such as reduction of posted speed limits, traffic incidents, accidents, weather conditions, lane and road closures, construction, planned or unplanned events impeding the flow of traffic, and the like. For example, an optimal route determination avoids road construction. The optimal route determination examines numerous potential routes with a strategy known in the art. A geographic information system (GIS), which includes built-in precision tools for allowing real-time analysis of traffic flow and vehicle speeds, examines multiple roads and routes. The GIS can determine the traffic volume of certain roads as well as the average speed of traffic flow on those roads thereby determining an optimal route.

In another example, a location other than the call center 170 determines the route. For example, the processor 122 in the MVCU 110 determines the route and transmits the determined route to the call center 170. Those skilled in the art will recognize a number of location(s) could alternatively determine the route in accordance with the present invention.

At step 230, at least one probable off-route condition is determined based on the route. The probable off-route conditions include locations along the determined route where one or more off-route conditions are likely to occur. Tests may be applied during or after the determination of the route, step 220. The tests include, for example, a point-of-interest test, a waypoint test, an intersection number test, an intersection density test, a distance between intersections test, an off-route condition history test, and a road classification test. When a given test is satisfied, this indicates location(s) where an off-road condition is/are likely to occur.

At step 240, an off-route condition history database is determined. In one example, the off-route condition history database is unique to each system user and is based on a personal off-road condition history. When a probable off-road condition is determined for a user, data including geographic coordinates of the vehicle (i.e., as determined by the GPS unit 126) are transmitted from the MVCU 110 to the call center 170. The data is stored (i.e., at the web-hosting portal 160 and/or the communication services manager 174) and acquired over time thereby forming the personal database. The data in the database is weighted by frequency of occurrence. Data weighting includes, for example, providing a weight factor wherein more frequently occurring historical off-road conditions locations are more likely to trigger a probable off-road condition at the same location. The personal database provides a determination of probable off-route condition(s) based on a user's tendency to experience an off-road condition at a given intersection. The determination is based on instances that include (un)intentionally taking a different route from the present determined route (i.e., by getting lost, visiting a point of interest, or another reason).

At step 250, digital map information is transmitted based on the determination of at least one probable off-route condition from the call center 170 to the MVCU 110 unit via a wireless connection. In one example, if a determination of a probable off-road condition is made, digital map information at and near the location (i.e., represented as a node, link, or shape point) of the probable off-road condition is transmitted. The amount of digital map information included in the transmission may vary and is defined at the call center 170 and/or another location. In addition, the amount of information may vary based on the type and location of the probable off-route condition. For example, when a point of interest is identified, digital map information including the location of the probable off-route condition as well as the area surrounding the point of interest is transmitted. As such, the digital map information is not limited to a fixed distance corridor around the determined route. The digital map information is stored in a database at the call center 170 and/or another location and includes map data along the route as well as surrounding map data where the probable off-road condition(s) was determined. Digital map information transmission, storage in and access to databases are known in the art.

At step 260, a route correction is determined based on the transmitted digital map information. In one example, the route correction is determined by the processor 122 based on transmitted digital map information from the call center 170. As the route correction is determined locally (i.e., at the vehicle), the amount of data to be transmitted from the call center 170 to the MVCU 110 is reduced. In one example, the route correction includes back to the determined route. Alternatively, the route correction includes turn-by-turn directions to the endpoint from the current position of the vehicle. Strategies for determining route correction are known in the art.

The method terminates at step 270 and is repeated as appropriate. Those skilled in the art will recognize that the step order may be varied and is not limited to the order defined herein. In addition, step(s) may be eliminated, added, or modified.

Figure 3:
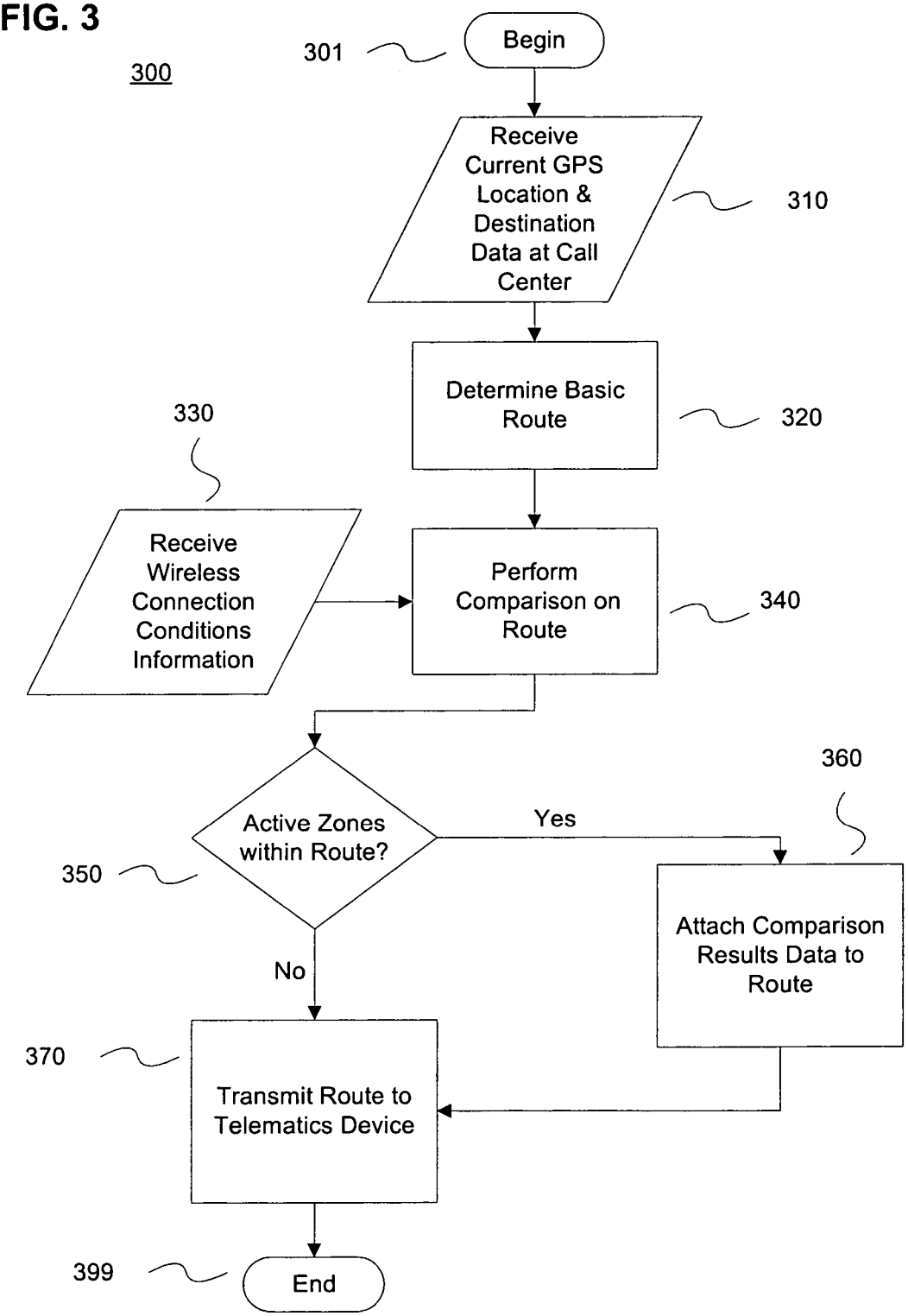
FIG. 3 illustrates a flowchart of providing wireless connection conditions along a planned navigation route to a mobile vehicle, in accordance with one example of the present invention.

FIG. 3 illustrates one example of a method 300 of providing wireless connection conditions to a mobile vehicle in accordance with the present invention. Method 300 begins at step 301.

The call center receives navigation route information in step 310. Navigation route information includes location and destination data. In one example, the call center receives the start point location data from the GPS unit 126 and the user requests a destination. In another example, both the start point and destination are received from the user.

The navigation route is determined in step 320. In one example, step 320 is implemented as in step 220.

The call center receives information concerning wireless connection conditions in step 330. In one example, the wireless connection conditions information includes any combination of active and inactive wireless connection issues. As used herein, wireless connection conditions includes both active and inactive wireless connection information. Inactive wireless connection information is any information that is not an active wireless connection issue. As used herein, an active wireless connection issue is any information that relates to circumstances in a particular geographic area. For example, an active wireless connection issue is, in one example, an amber alert. In another example, an active wireless connection issue is a 1×RTT data coverage outage or unavailability. In another example, an active wireless connection issue is geographic information concerning weather advisories. In another example, an active wireless connection issue is geographic information concerning traffic warnings.

The determined route and the wireless connection conditions information are compared at the call center at step 340. In one example, the desired route is segmented into geographic zones corresponding to zones in the wireless connection information. In one example, the route is segmented prior to the step 340 comparison. In another example, the route is segmented after the step 340 comparison. In yet another example, in the event that the route is segmented after the step 340 comparison, the step 340 iterates again to compare each segmented route with the wireless connection information. Each geographic zone along the determined navigation route is analyzed for wireless connection issues.

In one example, method 300 determines whether at least one zone along the navigation route contains an active wireless connection issue in step 350. If at least one zone along the navigation route contains an active wireless connection issue, additional information is sent to the mobile vehicle.

The data regarding the results of the comparison are attached to the navigation route data in step 360. Data in step 360 includes, for example, additional map and route data or notifications to the user regarding active wireless connection issues.

The call center transmits data the data from step 360 to the telematics device in the mobile vehicle via a wireless connection in step 370. Method 300 terminates at step 399.

Figure 4:
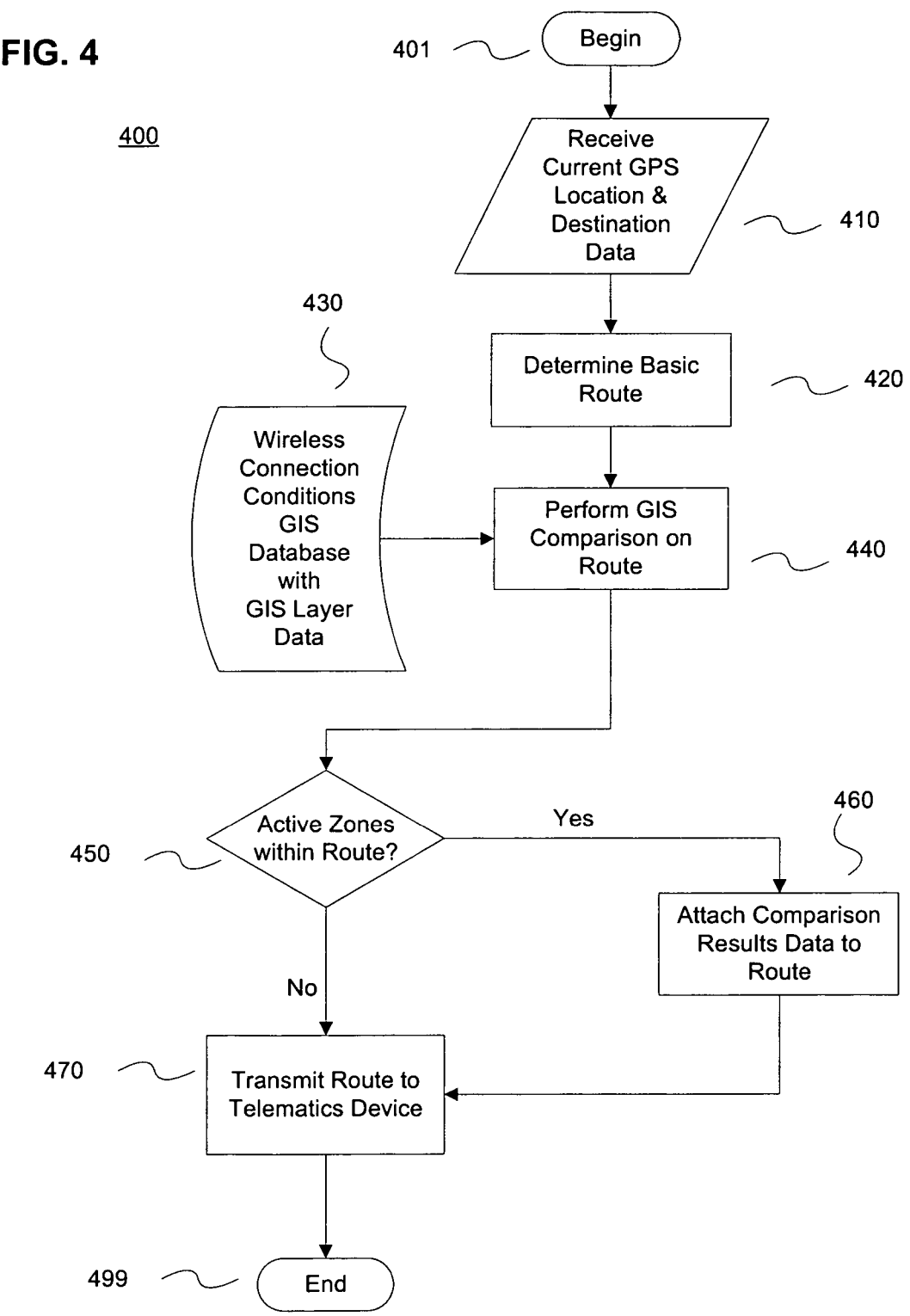
FIG. 4 illustrates a flowchart of another example of the present invention where a GIS database stores wireless conditions, in accordance with one example of the present invention.

FIG. 4 illustrates another example of a method 400 of providing wireless connection conditions to a mobile vehicle in accordance with the present invention. Method 400 begins at step 401.

The call center acquires location and destination data in step 410. In one example, step 410 is implemented as in step 310.

The navigation route is determined in step 420. In one example, step 420 is implemented as in step 220.

Wireless connection condition information is stored in a database in step 430. In the example shown in FIG. 4, geographic information systems (GIS) is shown. GIS is well known to those skilled in the art. Alternatively, other types of databases are capable of performing similar functions. In the example shown, a database layer of the GIS contains 1×RTT/packet data coverage stored by geographic zone. In other examples, databases include a variety of other information, such as but not limited to Evolutionary Data Only (EvDO), HSDPA (High Speed Data Packet Access) availability, 802.11 derivatives, broadband wireless, instant messaging, WiMAX (Worldwide Interoperability for Microwave Access), GPRS (General Packet Radio Service) and/or combinations thereof.

The navigation route GIS database layer containing the navigation route information is compared to the wireless connection conditions GIS database layer containing the wireless connection conditions in step 440. In one example, step 440 is implemented as in step 340.

In one example, method 400 determines whether at least one zone along the navigation route contains an active wireless connection issue in step 450. In one example, step 450 is implemented as in step 350.

In one example, if at least one zone along the navigation route contains an active wireless connection issue, the data regarding the results of the comparison are attached to the navigation route data in step 460. Data in step 460 includes, for example, additional map and route data or notifications to the user regarding active wireless connection issues. In one example, step 460 is implemented as in step 360.

The call center transmits the data from step 460 to the telematics device in the mobile vehicle via a wireless connection in step 470. In one example, step 470 is implemented as in step 370. Method 400 terminates at step 499.

Figure 5:
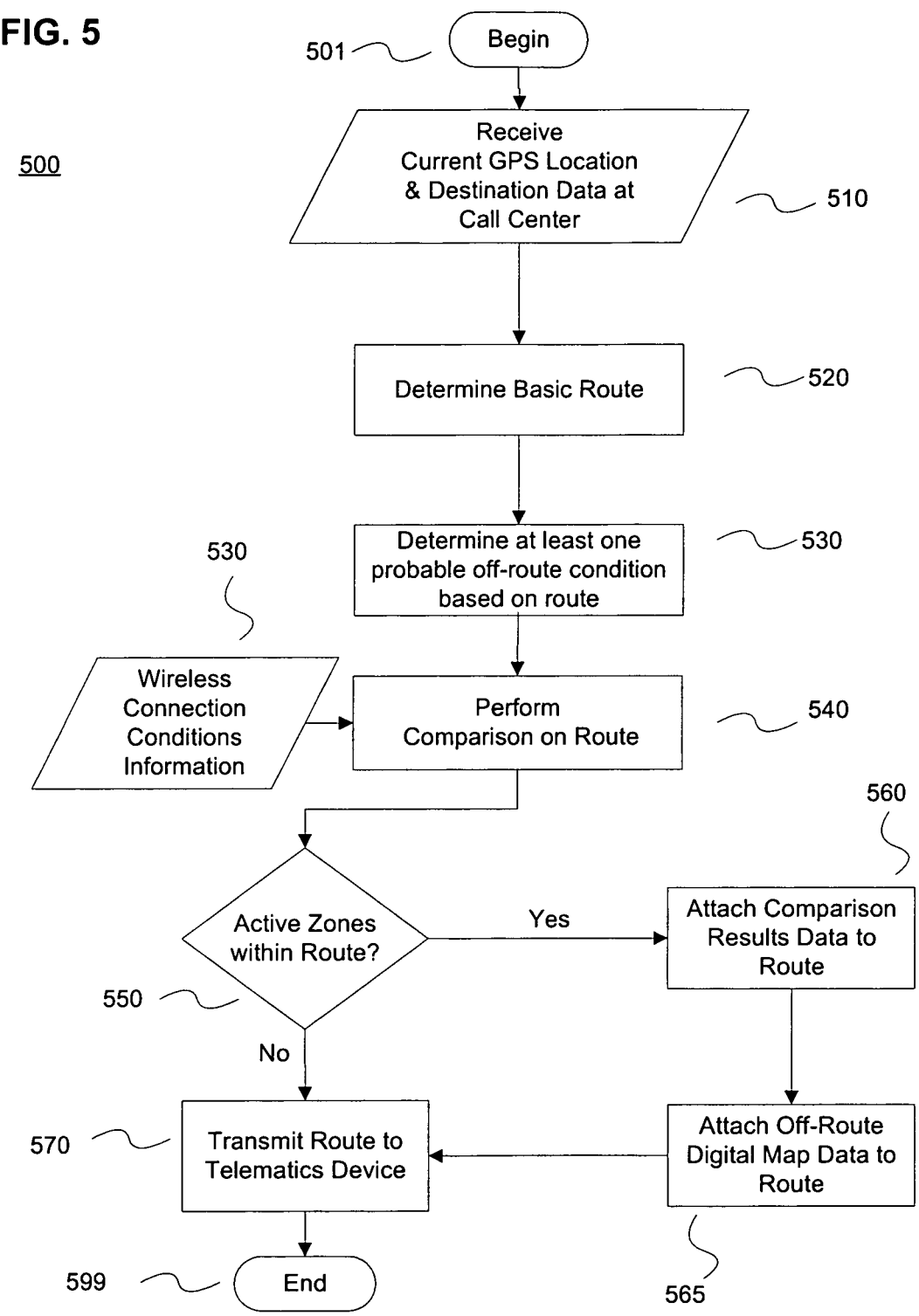
FIG. 5 illustrates a flowchart of another example of the present invention where off-route map data is transmitted to the mobile vehicle, in accordance with one example of the present invention.

FIG. 5 illustrates another example of a method 500 of providing wireless connection conditions to a mobile vehicle in accordance with the present invention. Method 500 begins at step 501.

The location and destination data is acquired in step 510. In one example, step 510 is implemented as in step 310.

The navigation route is determined in step 520. In one example, step 520 is implemented as in step 220.

At least one probable off-route condition based on the navigation route is determined in step 530. The probable off-route conditions include locations along the determined route where one or more off-route conditions are likely to occur. Tests may be applied during or after the determination of the route in step 520. In one example, step 530 is implemented as in step 230.

The determined route is compared to the wireless connection conditions information from step 530 in step 540. In one example, step 540 is implemented as in step 340.

In one example, method 500 determines whether at least one zone along the navigation route contains an active wireless connection issue is performed in step 550. In one example, step 550 is implemented as in step 350.

In one example, data regarding the results of the comparison are attached to the navigation route data in step 560. Data in step 560 includes, for example, additional map and route data or notifications to the user regarding active wireless connection issues. In one example, step 560 is implemented as in step 360.

Digital map information based on the probable off-route condition(s) is added to the route data in step 565. The amount of digital map information varies to ensure access to the off-route map without an active data connection. The amount of digital map information can be varied based on a number of factors, including, but not limited to, memory available within vehicle 110, bandwidth of the connection between the call center and vehicle 110, available resources at the call center 170, the level of detail appropriate to convey based on the digital map information, or the likelihood of an off-route condition.

The call center transmits the data from step 560 and step 565 to the telematics device in the mobile vehicle via a wireless connection in step 570. In one example, step 570 is implemented as in step 370. Method 500 terminates at step 599.

Figure 6:
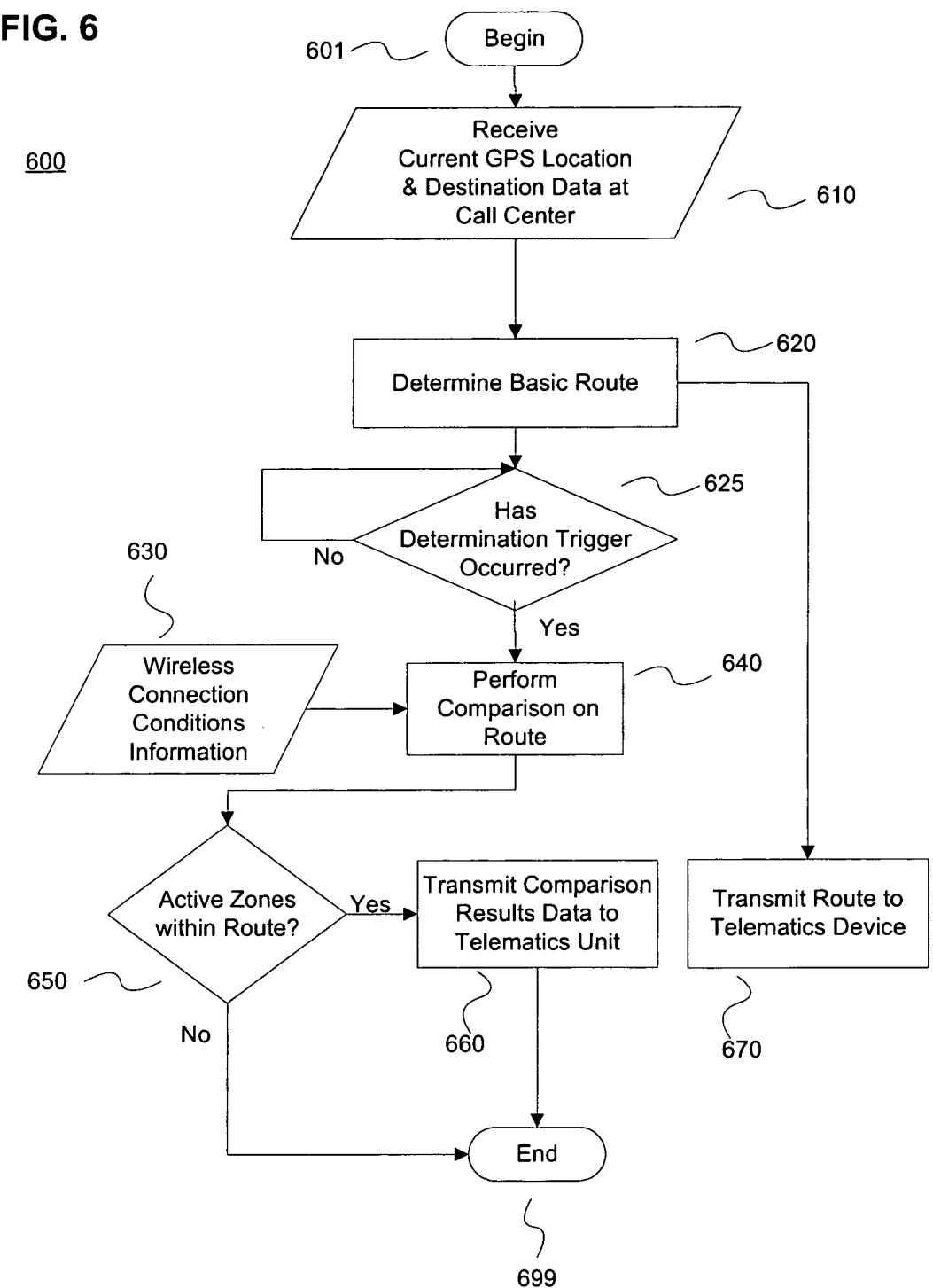
FIG. 6 illustrates a flowchart of another example of the present invention where a trigger event enables comparison of data, in accordance with one example of the present invention.

FIG. 6 illustrates one example of a method 600 of providing wireless connection conditions to a mobile vehicle in accordance with the present invention. Method 600 begins at step 601.

The location and destination data is acquired in step 610. In one example, step 610 is implemented as in step 310.

The navigation route is determined in step 620. In one example, step 620 is implemented as in step 220.

The navigation route data is then transmitted to the telematics device in step 670. In one example, step 670 is implemented as in step 370.

Method 600 determines whether a comparison trigger event has occurred in step 625. After step 620, the lack of a comparison trigger will prevent starting the comparison step 640 until the comparison trigger occurs. In one example of the invention, the comparison trigger is a mileage event, where step 640 begins after a preset number of miles traveled by the user or a preset distance of miles from a particular geographic zone. In another example, the comparison trigger is a time event, where step 640 begins at a specified time or an amount of time estimated before arrival at a geographic zone. Those skilled in the art would recognize many different events are capable of acting as a comparison trigger, for example: an off-peak time event where step 640 begins when the call center system is at a low workload or wireless bandwidth is less expensive, a route receipt event where step 640 begins as soon as the navigation route is received and determined, an advisor intervention event where a call center advisor manually starts step 640, or a change of conditions event where step 640 starts or restarts based on an addition or deletion of active zones within the navigation route.

Wireless connection conditions information is received in step 630. In one example, step 630 is implemented as in step 330.

The determined route is compared to the wireless connection conditions in step 640. In one example, step 640 is implemented as in step 340.

In one example, method 600 determines whether at least one zone along the navigation route contains an active wireless connection issue is performed in step 650. In one example, step 650 is implemented as in step 350.

The call center transmits the data, including active wireless connection issues, based on the comparison in step 640 to the telematics unit in the mobile vehicle via wireless connection in step 660. In one example, data in step 660 would include, for example, additional map and route data or alerts to the user. Method 600 terminates at step 699.

Figure 7:
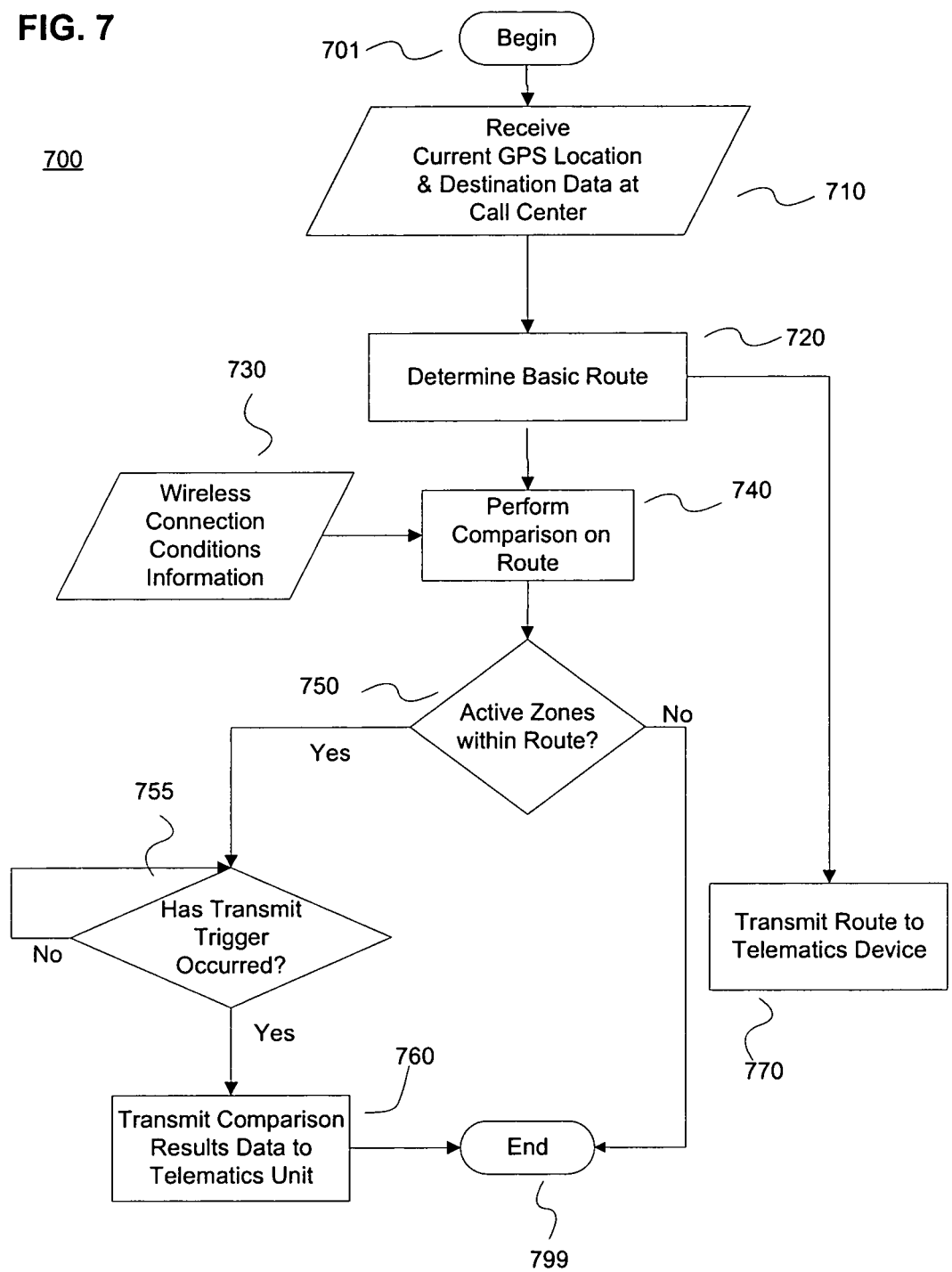
FIG. 7 illustrates a flowchart of another example of the present invention where a trigger event enables transmission of data, in accordance with one example of the present invention.

FIG. 7 illustrates one example of a method 700 of providing wireless connection conditions to a mobile vehicle in accordance with the present invention. Method 700 begins at step 701.

The location and destination data is acquired in step 710. In one example, step 710 is implemented as in step 310.

The navigation route is determined in step 720. In one example, step 720 is implemented as in step 220.

The navigation route data is then transmitted to the telematics device in the mobile vehicle via wireless connection in step 770.

Wireless connection conditions information is received in step 730. In one example, step 730 is implemented as in step 330.

The determined route is compared to the wireless connection conditions information from step 330 in step 740. In one example, step 740 is implemented as in step 340.

In one example, method 700 determines whether at least one zone along the navigation route contains an active wireless connection issue is performed in step 750. In one example, step 750 is implemented as in step 350.

Method 700 determines whether a transmission trigger event has occurred in step 755. After step 750, the lack of a transmission trigger will prevent starting the transmission in step 760 until the transmission trigger occurs. In one example of the invention, the transmission trigger is a mileage event, where step 760 begins after a preset number of miles traveled by the user or a preset distance of miles from a particular geographic zone. In another example, the transmission trigger is a time event, where step 760 begins at a specified time or an amount of time estimated before arrival at a geographic zone. Those skilled in the art would recognize many different events are capable of acting as a comparison trigger, for example: an off-peak time event where step 760 begins when the call center system is at a low workload or wireless bandwidth is less expensive, a comparison completion event where step 760 begins as soon as the comparison between the navigation route and the wireless conditions information in step 740 is complete, an advisor intervention event where a call center advisor manually starts step 760, or a change of conditions event where step 760 is started or restarted based on an addition or deletion of active zones within the navigation route.

The call center transmits the data, including active wireless connection issues, result from the comparison in step 740 to the telematics unit in the mobile vehicle in step 760. In one example, data in step 760 would include, for example, additional map and route data or alerts to the user. In one example, step 760 is implemented as in step 660. Method 700 terminates at step 799.

Figure 8:
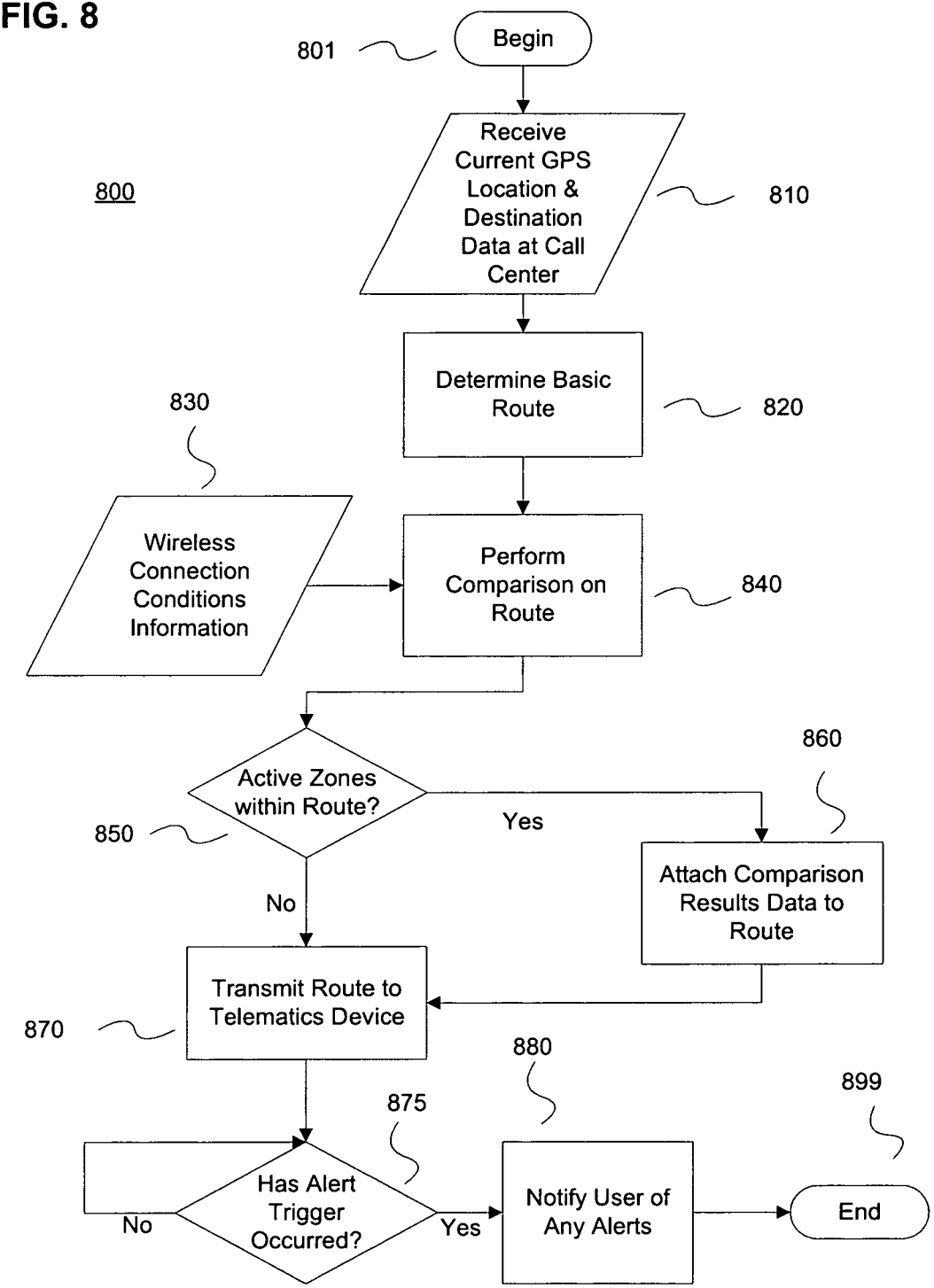
FIG. 8 illustrates a flowchart of another example of the present invention where a trigger event enables alert notification, in accordance with one example of the present invention.

FIG. 8 illustrates one example of a method 800 of providing wireless connection conditions to a mobile vehicle in accordance with the present invention. Method 800 begins at step 801.

The location and destination data is acquired in step 810. In one example, step 810 is implemented as in step 310.

The navigation route is determined in step 820. In one example, step 820 is implemented as in step 220.

Wireless conditions information is received in step 830. In one example, step 830 is implemented as in step 330.

The determined route is compared to the wireless connection conditions information from step 830 in step 840. In one example, step 840 is implemented as in step 340.

In one example, method 800 determines whether at least one zone along the navigation route contains an active wireless connection issue is performed in step 850. In one example, step 850 is implemented as in step 350.

Data regarding the results of the comparison are attached to the navigation route data in step 860. In one example, step 860 is implemented as in step 360.

The call center transmits the data to the telematics device in the mobile vehicle via wireless connection in step 870. In one example, step 870 is implemented as in step 370.

Method 800 determines whether an alert trigger event has occurred in step 875. After step 870, the lack of an alert trigger will prevent starting the alert notification in step 880 until the alert trigger occurs. In one example of the invention, the alert trigger is a mileage event, where step 880 begins after a preset number of miles traveled by the user or a preset distance of miles from a particular geographic zone. In another example, the alert trigger is a time event, where step 880 begins at a specified time or an amount of time estimated before arrival at a geographic zone. Those skilled in the art would recognize many different events are capable of acting as an alert trigger, for example: an advisor intervention event where a call center advisor manually starts step 880, or a change of conditions event where step 880 is started or restarted based on an addition or deletion of active zones within the navigation route.

The user is notified of any alert conditions in step 880. In one example of the invention, an alert issued at the mobile vehicle is an automated voice message. In other examples, a text message, graphical display or telephone call from a call center advisor are capable of notifying the user of any alerts in step 880. Method 800 terminates at step 899.

Figure 9:
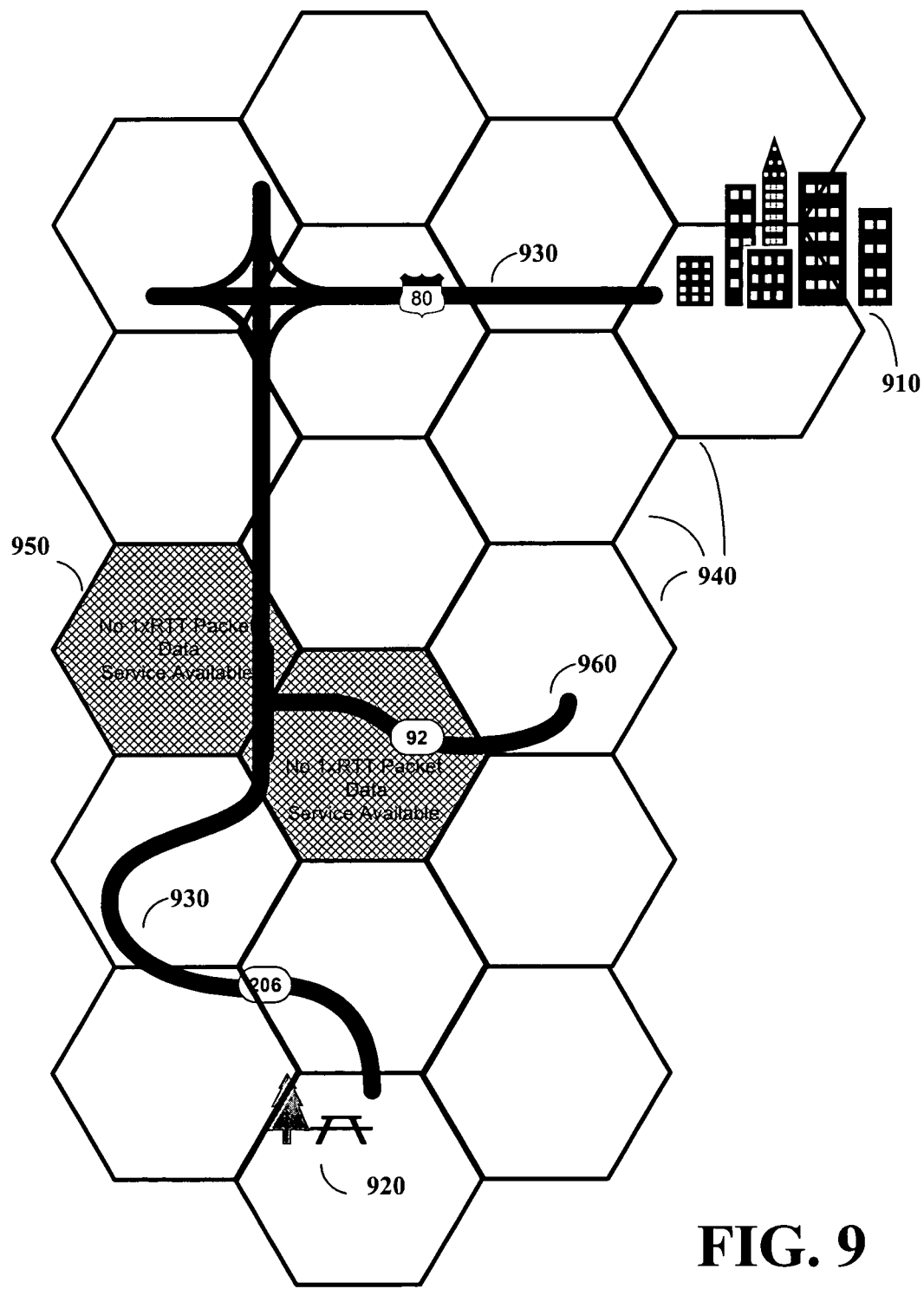
FIG. 9 illustrates a graphical representation of a cellular data packet coverage database layer imposed on a map with a navigation route, in accordance with one example of the present invention.

FIG. 9 illustrates a graphical representation of an example of the present invention where a 1×RTT/packet data coverage overlay map layer is used with a backend routing system database to determine the availability of 1×RTT packet data service along the specified route. After location 910 and destination data 920 is acquired, a navigation route is determined 930. The coverage overlay map layer is subdivided in to zones 940 for comparison to the navigation route. If any points along the navigation route 930 fall into the no data service category, as indicated by the hatched areas 950, an audible alert would be played after the first routing command, such as "automatic updates may not be available at all points along your route". Off-route navigation information is transmitted along with the alert to allow navigation back to planned route 930 if a different or incorrect road 960 is followed while in the no service zones 950.

Figure 10:
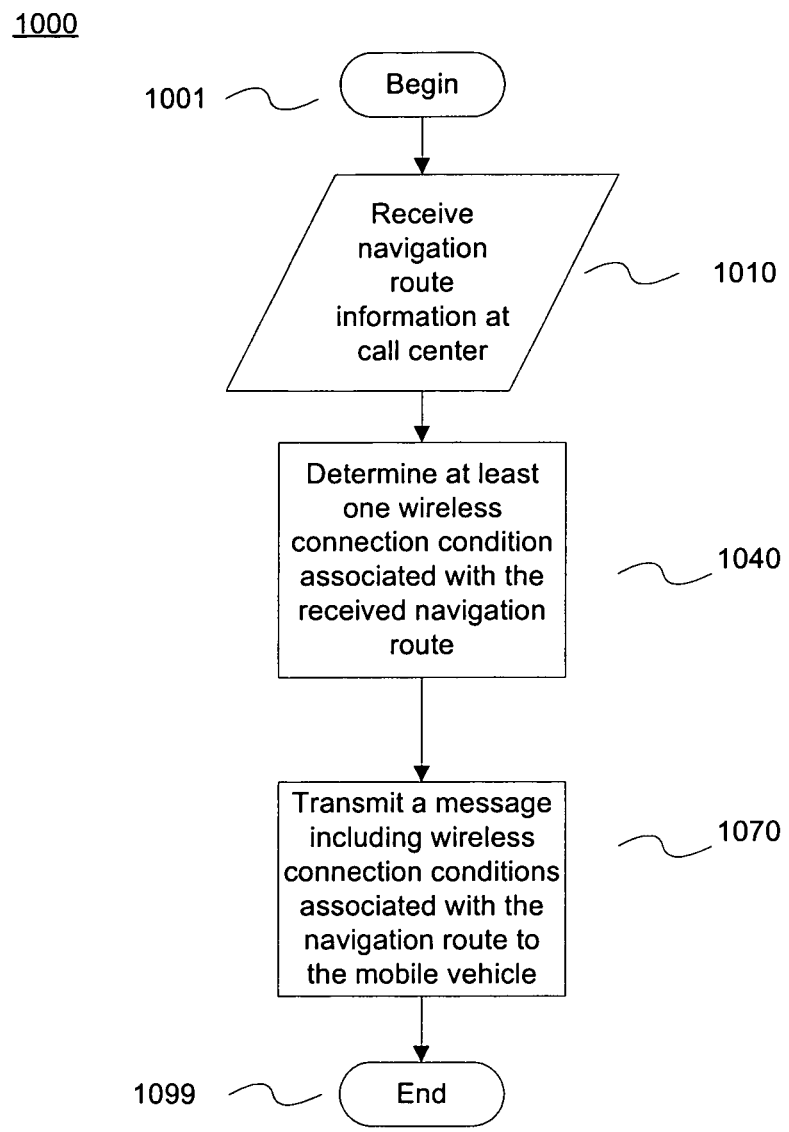
FIG. 10 illustrates a flowchart of a method for providing wireless connection conditions along a planned navigation route to a mobile vehicle, in accordance with one example of the present invention.

FIG. 10 illustrates one example of a method 1000 for providing wireless connection conditions to a mobile vehicle in accordance with the present invention. Method 1000 begins at step 1001.

The call center receives navigation route information in step 1010. Navigation route information includes location and destination data. In one example, the call center receives the start point location data from the GPS unit 126 and the user requests a destination. In another example, both the start point and destination are received from the user. The navigation route is determined based on the received start point and destination. In one example, the navigation route is determined as in step 220.

At least one wireless connection condition associated with the received navigation route is determined in step 1040. In one example, step 1040 is implemented as step 340.

A message including wireless connection conditions associated with the navigation route is transmitted to the mobile vehicle in step 1070. In one example, step 1070 is implemented as step 370. Method 1000 terminates at step 1099.

Figure 11:
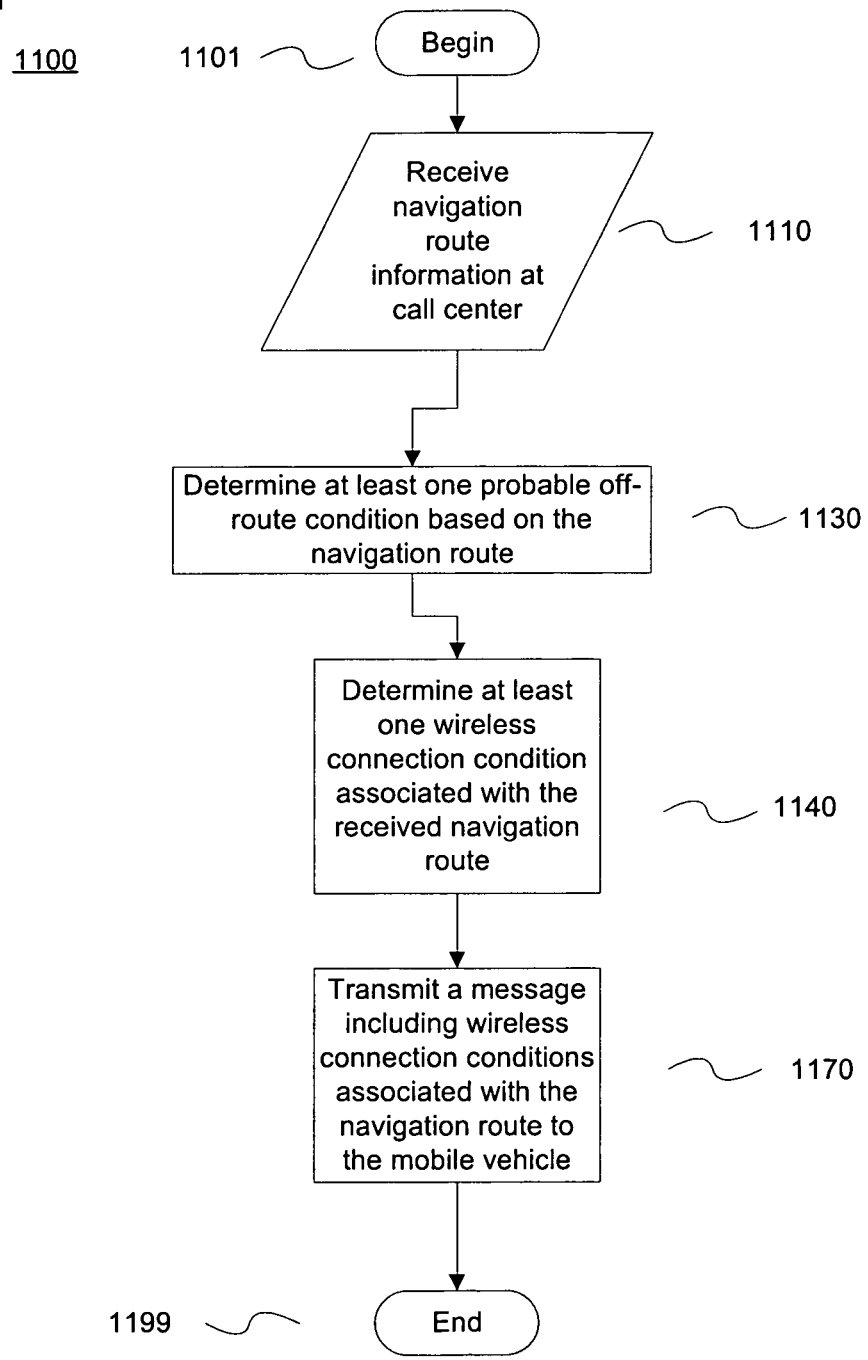
FIG. 11 illustrates a flowchart of a method for providing wireless connection conditions along a planned navigation route to a mobile vehicle, in accordance with one example of the present invention.

FIG. 11 illustrates one example of a method 1100 of providing wireless connection conditions to a mobile vehicle in accordance with the present invention. Method 1100 begins at step 1101.

The call center receives navigation route information in step 1110. Navigation route information includes location and destination data. In one example, the call center receives the start point location data from the GPS unit 126 and the user requests a destination. In another example, both the start point and destination are given by the user. The navigation route is also determined based on the received start point and destination. In one example, the navigation route is determined as in step 220.

At least one probable off-route condition based on the navigation route is determined in step 1130. The probable off-route conditions include locations along the determined route where one or more off-route conditions are likely to occur. In one example, step 1130 is implemented as in step 230.

At least one wireless connection condition associated with the received navigation route is determined in step 1140. In one example, step 1140 is implemented as step 340.

A message including wireless connection conditions associated with the navigation route is transmitted to the mobile vehicle in step 1170. In one example, step 1170 is implemented as step 370. Method 1100 terminates at step 1199.

Figure 12:
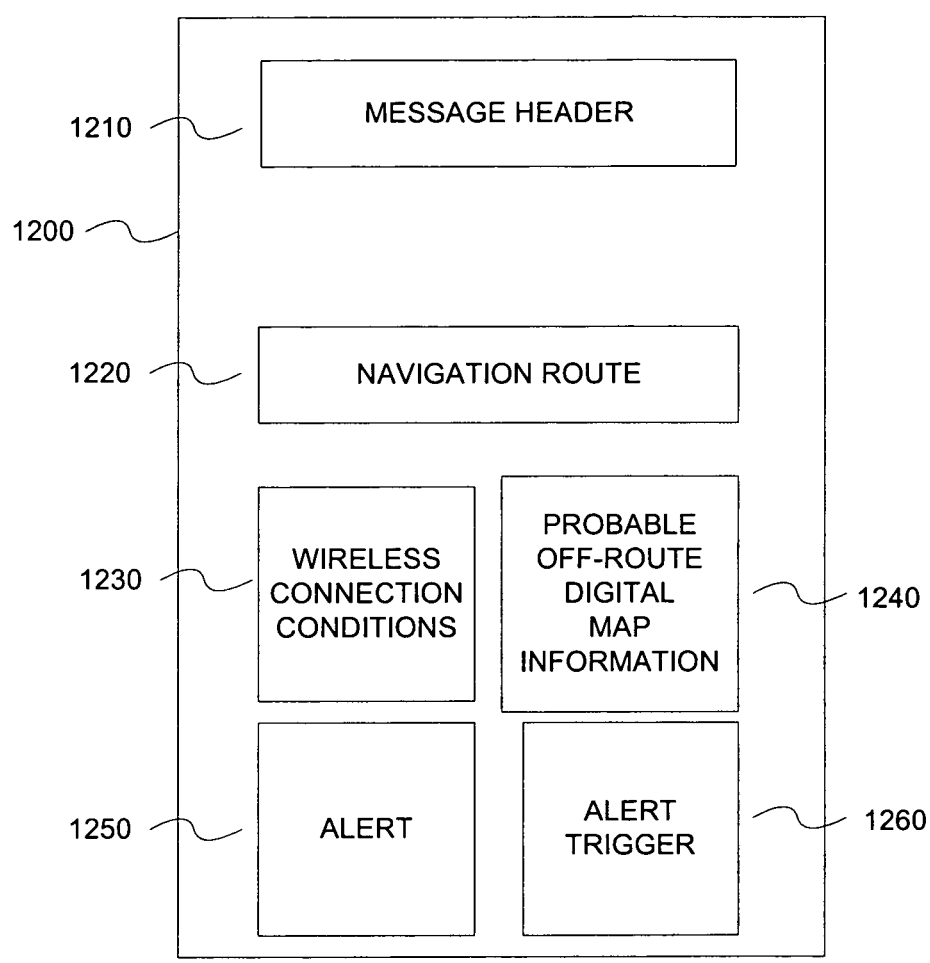
FIG. 12 illustrates a block diagram of a message transmitted to a telematics unit, in accordance with one example of the present invention.

FIG. 12 illustrates a block diagram of a message 1200 sent to the telematics unit, in accordance with one example of the present invention.

Message 1200 contains a header 1210 including information such as user identification and time. The header 1210 can contain any appropriate information, including but not limited to message format, checksum data, date and time, or any other appropriate data.

The navigation route 1220 includes, for example, turn-by-turn directions for navigating the vehicle from the startpoint origin to the endpoint destination.

Wireless connection conditions 1230 include any combination of active and inactive wireless connection issues. For example, the message 1200 contains an active wireless connection issue. For example, an active wireless connection issue is, in one example, an amber alert. In another example, an active wireless connection issue is a 1×RTT data coverage outage or unavailability. In another example, an active wireless connection issue is geographic information concerning weather advisories. In another example, an active wireless connection issue is geographic information concerning traffic warnings.

In one example, probable off-route digital map information 1240 is included in message 1200. In one example, if a determination of a probable off-road condition is made, probable off-road digital map information 1240 at and near the location (i.e., represented as a node, link, or shape point) of the probable off-road condition is transmitted. The amount of digital map information included in the transmission may vary and is defined at the call center 170 and/or another location. In addition, the amount of information may vary based on the type and location of the probable off-route condition. For example, when a point of interest is identified, digital map information including the location of the probable off-route condition as well as the area surrounding the point of interest is transmitted. As such, the probable off-route digital map information 1240 is not limited to a fixed distance corridor around the determined route.

In one example of the invention, an alert 1250 is included in message 1200. In one example of the invention, an alert 1250 is an automated voice message. In other examples, a text message, or graphical display function is included in alert 1250.

In one example of the invention, an alert trigger 1260 is included in message 1200. In one example of the invention, the alert trigger is a mileage event, where alert 1250 is presented to a driver within the vehicle after a preset number of miles traveled by the user or a preset distance of miles from a particular geographic zone. In another example, the alert trigger 1260 is a time event, where alert 1250 begins at a specified time or an amount of time estimated before arrival at a geographic zone. Those skilled in the art would recognize many different events are capable of acting as an alert trigger, for example: a change of conditions event where alert 1250 is started or restarted based on an addition or deletion of active zones within the navigation route.

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing a navigation route to a mobile vehicle, the method comprising:
    determining, at a call center, a navigation route based on information included in a navigation route request;
    determining, at the call center, at least one of i) an off-route condition, or ii) a wireless connection condition associated with the navigation route;
    transmitting the navigation route from the call center to a telematics unit in the mobile vehicle; and
    transmitting a data packet from the call center to the telematics unit, the data packet including at least one of i) the off-route condition, or ii) the wireless connection condition associated with the navigation route.

2. The method of claim 1 wherein the wireless connection condition is stored in a geographic information system (GIS) database.

3. The method of claim 2 wherein the wireless connection condition stored in the GIS database is selected from the group consisting of:
    1×RTT/packet data coverage, Evolutionary Data Only, High Speed Data Packet Access, 802.11, broadband wireless, instant messaging, Worldwide Interoperability for Microwave Access, and General Packet Radio Service.

4. The method of claim 2 wherein the wireless connection condition is determined by comparing a navigation route GIS database layer containing the navigation route information with a wireless connection condition GIS database layer containing the wireless connection condition.

5. The method of claim 1 wherein the data packet further includes a digital map based on the off-route condition.

6. The method of claim 1 wherein the determining of the wireless connection condition associated with the navigation route is responsive to a comparison trigger, the comparison trigger being selected from the group consisting of: a route receipt event, a mileage traveled event, a mileage until zone event, a time elapsed event, a time until zone event, an off-peak time event, an advisor intervention event, or a change of conditions event.

7. The method of claim 1 wherein the transmitting of the wireless connection condition associated with the navigation route is responsive to a transmission trigger, the transmission trigger being selected from the group consisting of: a completion of comparison event, a mileage traveled event, a mileage until zone event, a time elapsed event, a time until zone event, an off-peak time event, an advisor intervention event, or a change of conditions event.

8. The method of claim 1 wherein the data packet further comprises an alert, the alert being selected from the group consisting of: a text message, an automated voice message, an audible alert, a text-based alert, a graphical display, or an alert directly from an advisor in the call center.

9. The method of claim 8 wherein the data packet further comprises an alert trigger, and wherein the alert is responsive to the alert trigger, and wherein the alert trigger is selected from the group consisting of: a data receipt event, a mileage traveled event, a mileage until zone event, a time elapsed event, a time until zone event, an advisor intervention event, or a change of conditions event.

10. A computer usable medium comprising computer readable program code for providing a navigation route to a mobile vehicle, the medium comprising:
    computer readable program code for determining, at a call center, a navigation route based on information included in a navigation route request;
    computer readable program code for determining, at the call center, at least one of i) an off-route condition, or ii) a wireless connection condition associated with the navigation route;
    computer readable program code for transmitting the navigation route from the call center to a telematics unit in the mobile vehicle; and
    computer readable code for transmitting a data packet, from the call center to the telematics unit, the data packet including the at least one of i) the off-route condition, or ii) the wireless connection condition associated with the navigation route.

11. The medium of claim 10 further comprising a computer readable program code for storing and retrieving the wireless connection condition in a geographic information system (GIS) database.

12. The medium of claim 11 wherein the wireless connection condition stored in the GIS database is selected from a group of:
    1×RTT/packet data coverage, Evolutionary Data Only, High Speed Data Packet Access, 802.11, broadband wireless, instant messaging, Worldwide Interoperability for Microwave Access, and General Packet Radio Service.

13. The medium of claim 11 wherein the wireless connection condition is determined by a computer readable program code for comparing a navigation route GIS database layer containing the navigation route information with a wireless connection condition GIS database layer containing the wireless connection condition.

14. The medium of claim 10 wherein the data packet further includes a digital map based on the off-route condition.

15. The medium of claim 10 wherein the computer readable code for the determining of the wireless connection condition associated with the navigation route is responsive to a comparison trigger, the comparison trigger being selected from the group consisting of: a route receipt event, a mileage traveled event, a mileage until zone event, a time elapsed event, a time until zone event, an off-peak time event, an advisor intervention event, or a change of conditions event.

16. The medium of claim 10 wherein the computer readable code for the transmitting of the wireless connection condition associated with the navigation route is responsive to a transmission trigger, the transmission trigger being selected from the group consisting of: a completion of comparison event, a mileage traveled event, a mileage until zone event, a time elapsed event, a time until zone event, an off-peak time event, an advisor intervention event, or a change of conditions event.

17. The medium of claim 10 wherein the data packet further comprises an alert, the alert being selected from the group consisting of: a text message, an automated voice message, an audible alert, a text-based alert, a graphical display, or an alert directly from an advisor in the call center.

18. The medium of claim 17 wherein the data packet further comprises an alert trigger, and wherein the alert is responsive to the alert trigger, the alert trigger being selected from the group consisting of: a data receipt event, a mileage traveled event, a mileage until zone event, a time elapsed event, a time until zone event, an advisor intervention event, or a change of conditions event.

19. A system for providing a navigation route to a mobile vehicle, the system comprising:
   means for determining, at a call center, a navigation route based on information included in a navigation route request,
   means for determining, at the call center, at least one of i) an off-route condition, or ii) a wireless connection condition associated with the navigation route;
   means for transmitting the navigation route from the call center to a telematics unit in the mobile vehicle; and
   means for transmitting a data packet, from the call center to the telematics unit, the data packet including the at least one of i) the off-route condition, or ii) the wireless connection condition associated with the navigation route.

20. The system of claim 19 wherein the data packet further includes a digital map based on the off-route condition.

21. The method of claim 1 wherein after the navigation route is determined, the method further comprises:
   receiving information related to the wireless connection condition;
   comparing the information related to the wireless connection condition with the navigation route; and
   transmitting, from the call center to the mobile vehicle, the navigation route and results from the comparison.

22. The method of claim 21 wherein the results from the comparison include at least one of: additional navigational route data, additional map data, a notification regarding an active wireless connection issue, or combinations thereof.

23. The method of claim 21, further comprising:
   segmenting the navigation route into at least one zone; and
   comparing the at least one zone with the information related to the wireless connection condition.

* * * * *